Figure 1:
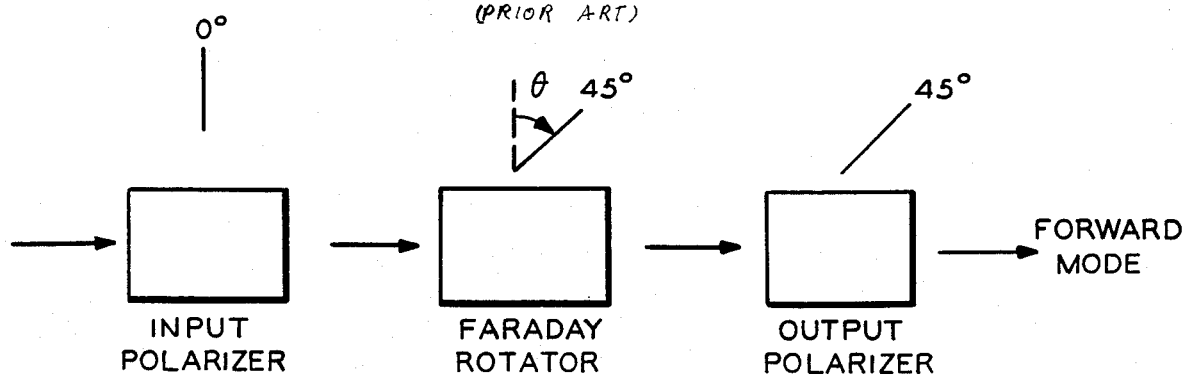

United States Patent [19]

Wilson et al.

[11] Patent Number: 4,856,878
[45] Date of Patent: Aug. 15, 1989

[54] MAGNETIC CONFIGURATION FOR FARADAY ROTATORS

[76] Inventors: Donald K. Wilson, 102 Hillside Ave., West Caldwell, N.J. 07006; Allan Heiney, 292 N. Fifth Ave., Highland Park, N.J. 08904

[21] Appl. No.: 128,598

[22] Filed: Dec. 4, 1987

[51] Int. Cl.[4] ................................................ G02F 1/09
[52] U.S. Cl. .................................... 350/375; 350/376; 350/384
[58] Field of Search .................. 350/376, 384, 375

[56] References Cited

PUBLICATIONS

K. P. Birch, "A Compact Optical Isolator," *Optics Communications*, vol. 43, No. 2, Sep. 15, 1982.

*Primary Examiner*—Bruce Y. Arnold
*Attorney, Agent, or Firm*—John N. Bain; Raymond J. Lillie

[57] ABSTRACT

A Faraday rotator having an optical element and a donut magnet of length 1.0L for generating a magnetic field along the optical axis of the optical element in order to rotate a plane of polarization of polarized light. At each end of the donut magnet of length 1.0L is a tuning magent of a length from about 0.4L to about 0.7L, with each of said tuning magnets generating a magnetic field in a direction opposite to that of the donut magnet.

12 Claims, 1 Drawing Sheet

OPTICAL ISOLATOR
(PRIOR ART)

OPTIMUM MAGNET CONFIGURATION

MAGNETIC CONFIGURATION FOR FARADAY ROTATORS

This application relates to Faraday rotators which rotate the plane of polarization of polarized light. Faraday rotators comprise an optical element having an optical axis, said optical element being made of a light transmitting material having a Verdet constant, and a means for generating a magnetic field along the optical axis of the optical element, thereby rotating the plane of polarization of polarized light. More particularly, the application relates to Faraday rotators having tuning magnets located at opposite ends of the means for generating the magnetic field along the optical axis of the optical element. This application also relates to optical isolators having this type of Faraday rotator.

An optical isolator is a device which prevents or reduces feedback of light transmitted from a light source. An optical isolator generally comprises an input polarizer, a Faraday rotator, and an output polarizer. The input polarizer polarizes light waves or beams traveling from a light source, such as a laser, so that the light becomes linearly polarized. In this way, a plane of polarization of polarized light is formed. The polarized light then travels to the optical element, of a Faraday rotator. The Faraday rotator has a means for generating a magnetic field along an optical axis in the optical element, thereby rotating the plane of polarization of the polarized light. This rotation may be clockwise or counterclockwise. This means is usually in the form of a permanent magnet or an electromagnet, and can be in a shape of a donut which surrounds the optical element. The optical element is made of an optically transmitting material having a Verdet constant. The optical element may be in the form of a rod. The Verdet constant is a measure of a material's ability to rotate the plane of polarization of polarized light. In the Faraday rotator, the plane of polarization of polarized light is rotated by a desired angle of rotation $\theta$.

After exiting the Faraday rotator, the polarized light enters the outer polarizer. The output polarizer has a plane of polarization parallel to that of the light which exits the Faraday rotator. The polarized light then exits the output polarizer and enters into a system or begins its intended use. A series of reflections of the light may the occur. Some of the light is reflected back toward the original source, which travels in the reverse direction at random polarization.

The reflected polarized light, being of random polarization, re-enters the output polarizer in the reverse direction. The output polarizer creates a plane of polarization of the light at an angle of rotation $\theta$. The reflected light then exits the output polarizer and re-enters the Faraday rotator. In the Faraday rotator, the polarized light, which has a plane of polarization at a desired angle of rotation $\theta$, again has its plane of polarization at desired angle of rotation $\theta$, thus resulting in a total angle of rotation $2\theta$.

The polarized light then exits the Faraday rotator and re-enters and input polarizer. When the total angle of rotation $2\theta$ equals 90°, extinction or maximum isolation of the reflected light in the input polarizer occurs. In this way, feedback of the reflected polarized light to the light source is prevented.

It has been known in the art to use tuning magnets at the front end and the rear end of a Faraday rotator in order to optimize the field strength of the magnet which generates the magnetic field about the optical axis of the optical element in order to rotate the plane of polarization of polarized light. Applicant's invention relates to an improved configuration of a Faraday rotator having tuning magnets.

Applicant's invention is a Faraday rotator which comprises an optical element having an optical axis, said optical element being made of a light transmitting material, and a first magnet for generating a magnetic field along the optical axis of the optical element, said magnet having a front end and a rear end. The magnetic field is being generated in one direction and the first magnet has a specified length 1.0 L. The Faraday rotator also comprises a pair of tuning magnets, with each tuning magnet being located at a front end and a rear end of the first magnet, and each tuning magnet generates a magnetic field in a direction opposite to the direction of the magnetic field being generated by the first magnet. The total combined length of the tuning magnets may be from about 0.8L to about 1.4L, preferably about 1.0L. Each tuning might therefore has a length of about 0.4L to about 0.7L. In a preferred embodiment, each of the tuning magnets has a specified length $\frac{1}{2}$ L. Each of said tuning magnets preferably is a permanent magnet. The tuning magnets may be permanent magnets made of rare earth materials containing samarium and cobalt or neodymium, iron, and boron. Applicant's invention also includes an optical isolator containing a Faraday rotator in accordance with the above-described invention, said optical isolator also comprising an input polarizer and an output polarizer.

Figure 2:
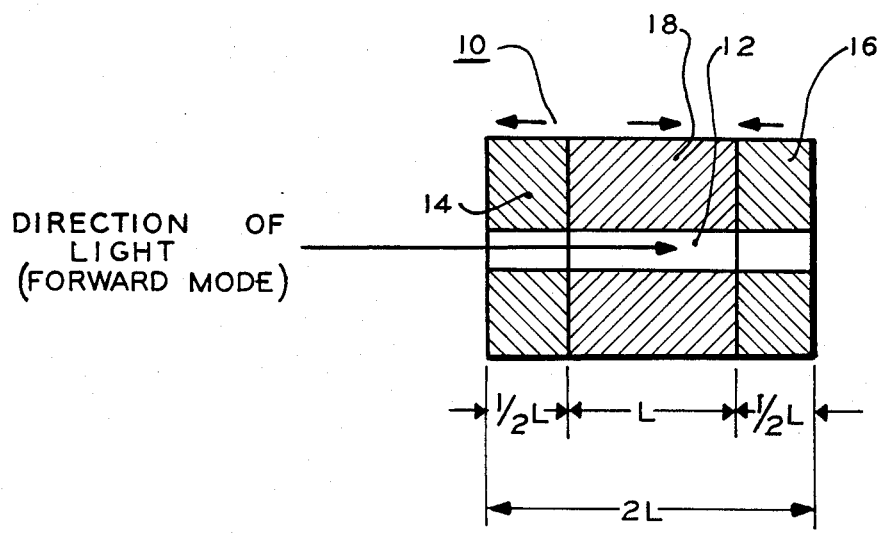

FIG. 1 is a block diagram of an example of how an optical isolator rotates the plane of polarization of polarized light; and FIG. 2 is a cross-sectional view of an embodiment of a Faraday rotator in accordance with the present invention.

Referring now to the drawings, light from a source enters an input polarizer, whereby light which has been transmitted from the source in one direction is linearly polarized. In this way, a plane of polarization of polarized light is created.

The polarized light, traveling in the forward mode, enters the optical element 12 of the Faraday rotator 10. The optical element 12, in this embodiment, is made of an optically transmitting material which has a Verdet constant. In the embodiment shown, the Faraday rotator 10 comprises the optical element 12 surrounded by a disc shaped or donut shaped magnet. The magnet may be a permanent magnet or an electromagnet. A permanent magnet is preferred. As shown in the drawings, the permanent magnet 18 has a length L. The optical element 12, in a preferred embodiment, has a length of L or slightly less than L.

At each end of the donut shaped magnet 18 having a length L is a tuning magnet 14 or 16 which in the preferred embodiment has a length $\frac{1}{2}$ L, although each magnet 14 and 16 may have a length of about 0.4L to about 0.7L. The combined length of the tuning magnets 14 and 16 therefore in the preferred embodiment equals 1.0 L, although the combined length of the tuning magnets 14 and 16 may be from about 0.8L to about 1.4L. In preferred embodiments, the tuning magnets 14 and 16 are permanent magnets made of rare earth materials such as samarium and cobalt or neodymium, iron, and boron.

The tuning magnets 14 and 16 serve to optimize the strength of the magnetic field which is generated along the axis of rotation of the optical element 12. As can be seen from the drawings, each tuning magnet 14 and 16 generates a magnetic field in a direction opposite that generated by the donut magnet 18 of length L surrounding the optical element 12. In the case of permanent tuning magnets made of samarium and cobalt, or neodymium, iron, and boron, a potential as high as 12,500 Gauss may be realized.

The Faraday rotator 10, by generation of a magnetic field along the optical axis of the optical element 12, rotates the plane of polarization of polarized light. The magnetic field which is generated to rotate the plane of polarization of polarized light, is generated by the donut magnet 18 surrounding the optical element 12. The plane of polarization of polarized light is rotated by an optimum angle of rotation $\theta$. The rotation may be clockwise or counterclockwise. In the embodiment shown, the angle of rotation by which the plane of polarization is rotated is 45°.

After the plane of polarization of the polarized light has been rotated, the polarized light exits the optical element 12 of the Faraday rotator 10 and enters the output polarizer. The output polarizer has a plane of polarization parallel to the plane of polarization of the light which has exited the Faraday rotator. The polarized light then enters into a system or begins its intended use whereby a series of reflections can occur. Some of the light is reflected back toward the light source, thereby traveling in the reverse direction and at random polarization.

The reflected polarized light, traveling in the reverse mode at random polarization, re-enters the output polarizer, wherein the reflected polarized light is polarized in a plane of polarization at desired angle of rotation $\theta$, or, in the preferred embodiment, 45°. The reflected polarized light then re-enters the optical element 12 of the Faraday rotator 10.

In the optical element 12 of the Faraday rotator 10, the reflected polarized light, which has a plane of polarization at an angle of rotation of 45°, or $\theta$, has its plane of polarization rotated another 45°, or $\theta$, thus making the total angle of rotation of the plane of polarization 90°, or $2\theta$. The reflected polarized light has its plane of polarization rotated in the Faraday rotator 10 by the generation of a magnetic field along the optical axis of the optical element 12 by the donut magnet 18 having a length L. The generation of the magnetic field along the optical axis of the optical element 12 is optimized by the tuning magnets 14 and 16 at each end of the donut magnet 18 of length L, each of said tuning magnets 14 and 16 in the embodiment shown having a length of ½ L, and each of said tuning magnets 14 and 16 generating a magnetic field in a direction opposite to that generated by the donut magnet 18 of length L. This results in the optimal rotation of the plane of polarization of polarized light.

Upon rotation of the plane of polarization of the reflected polarized light another 45°, or $\theta$, for a total angle of rotation of 90°, or $2\theta$, the reflected polarized light exits the Faraday rotator and enters the input polarizer. In the input polarizer, the reflected polarized becomes extinct or maximally isolated. In this way, the optical isolator prevents feedback of transmitted light. Although the Faraday rotator in the embodiment shown rotates the plane of polarization of polarized light 45° at each pass of polarized light through the optical element, the angle of rotation may be other than 45°, thus making the total angle of rotation $2\theta$ of the plane of polarization of reflected polarized light other than 90°. In such embodiments, there may be some feedback of reflected transmitted light to the light source, but less feedback than if no optical isolator were present.

It is to be understood, however, that the Faraday rotator and optical isolator of the present invention are not to be limited to the specific embodiments described above. The invention may be practiced other than as particularly described and still be within the scope of the accompanying claims.

What is claimed is:

1. A Faraday rotator comprising:
   an optical element having an optical axis, said optical element being made of a light transmitting material;
   a first magnet for generating a magnetic field along the optical axis of said optical element, said magnet having a front end and a rear end, said magnetic field being generated in one direction and said first magnet having a specified length 1.0L; and
   a pair of tuning magnets, each tuning magnet being located at a front end or a rear end of said first magnet, each tuning magnet generating a magnetic field in a direction opposite to the direction of the magnetic field being generated by said first magnet, and the total combined length of said tuning magnets being from about 0.8L to about 1.4L.

2. The Faraday rotator of claim 1 wherin each of said tuning magnets has a length of from about 0.4L to about 0.7L.

3. The Faraday rotator of claim 2 wherein each of said tuning magnets has a specified length ½ L.

4. The Faraday rotator of claim 1 wherein each of said tuning magnets is a permanent magnet.

5. The Faraday rotator of claim 4 wherein each of said tuning magnets is a permanent magnet made of a material containing samarium and cobalt.

6. The Faraday rotator of claim 4 wherein each of said tuning magnets is a permanent magnet made of a material containing neodymium, iron, and boron.

7. An optical isolator comprising:
   an input polarizer or polarizing beams or waves of light;
   a Faraday rotator, said Faraday rotator comprising:
   an optical element having an optical axis, said optical element being made of a light transmitting material;
   a first magnet for generating a magnetic field along the optical axis of said optical element, said magnet having a front end and a rear end, said magnetic field being generated in one direction and said first magnet having a specified length 1.0L; and
   a pair of tuning magnets, each tuning magnet being located at a front end or a rear end of said first magnet, each tuning magnet generating a magnetic field in a direction opposite to the direction of the magnetic field being generated by said first magnet, and the total combined length of said tuning magnets being from about 0.8L to about 1.4L; and
   an output polarizer.

8. The optical isolator of claim 7 wherein each of said tuning magnets has a length of from about 0.4L to about 0.7L.

9. The optical isolator of claim 8 wherein each of said tuning magnets has a specified length ½ L.

10. The optical isolator of claim 7 wherein each of said tuning magnets is a permanent magnet.

11. The optical isolator of claim 10 wherein each of said tuning magnets is a permanent magnet made of a material containing samarium and cobalt.

12. The optical isolator of claim 10 wherein each of said tuning magnets is a permanent magnet made of a material containing neodymium, iron, and boron.

* * * * *